(12) United States Patent
Hsiao et al.

(10) Patent No.: US 6,906,893 B2
(45) Date of Patent: Jun. 14, 2005

(54) MAGNETIC HEAD COIL AND STRUCTURE FOR PROTECTING SAME DURING POLE NOTCH PROCESSING

(75) Inventors: Wenchein Hsiao, San Jose, CA (US); Edward Hin Pong Lee, San Jose, CA (US); Bradley D. Webb, San Jose, CA (US)

(73) Assignee: Hitachi Global Storage Technologies (NL)

( * ) Notice: Subject to any disclaimer, the term of this patent is extended or adjusted under 35 U.S.C. 154(b) by 181 days.

(21) Appl. No.: 10/267,345

(22) Filed: Oct. 8, 2002

(65) Prior Publication Data

US 2004/0066577 A1 Apr. 8, 2004

(51) Int. Cl.[7] .............................................. G11B 5/147
(52) U.S. Cl. ...................................................... 360/126
(58) Field of Search ......................................... 360/126

(56) References Cited

U.S. PATENT DOCUMENTS

| | | | |
|---|---|---|---|
| 4,190,872 A | 2/1980 | Jones, Jr. et al. | 360/125 |
| 4,589,042 A | 5/1986 | Anderson et al. | 360/125 |
| 4,878,290 A | 11/1989 | Masud et al. | 29/603 |
| 5,245,493 A | 9/1993 | Kawabe et al. | 360/126 |
| 6,233,813 B1 | 5/2001 | Sasaki et al. | 29/603.14 |
| 6,349,014 B1 * | 2/2002 | Crue et al. | 360/123 |

FOREIGN PATENT DOCUMENTS

| | | | |
|---|---|---|---|
| JP | 62-222651 | 9/1987 | H01L/21/82 |
| JP | 63-168812 | 7/1988 | G11B/5/31 |
| JP | 63-231715 | 9/1988 | G11B/5/31 |
| JP | 1-92918 | 4/1989 | G11B/5/31 |
| JP | 2-56711 | 2/1990 | G11B/5/31 |
| JP | 5-46944 | 2/1993 | G11B/5/31 |
| JP | 11-312304 | 11/1999 | G11B/5/31 |
| JP | 11-312305 | 11/1999 | G11B/5/31 |
| JP | 11-174994 | 1/2001 | G11B/5/31 |

OTHER PUBLICATIONS

"Self–Aligned, Very Narrow Trackwidth Inductive Thin Film Heads for Very High Track Density" IBM Technical Disclosure Bulletin, vol. 35, No. 3, Aug. 1992.

Campbell, R. et al., "Perfectly Aligned Pole Tips by Using Full Film P2 Process with $Al_2O_3$ Protection Layer" Research Disclosure, Apr. 1987, No. 276, England.

* cited by examiner

*Primary Examiner*—A.J. Heinz
(74) *Attorney, Agent, or Firm*—Zilka-Kotab, PC

(57) ABSTRACT

A system and method are provided for manufacturing a magnetic head. Initially, a coil structure, a first pole layer, and a gap layer are formed. A second pole layer is then deposited to form a pair of flanking portions flanking a central portion of the second pole layer. Thereafter, the second pole layer is masked with a photoresist layer. During manufacture, the flanking portions of the second pole layer work in conjunction with the photoresist layer to substantially protect the coil structure from damage.

9 Claims, 9 Drawing Sheets

MAGNETIC HEAD COIL AND STRUCTURE FOR PROTECTING SAME DURING POLE NOTCH PROCESSING

FIELD OF THE INVENTION

The present invention relates to magnetic head coil structures, and more particularly, this invention relates to protecting magnetic head coil structures during related processing.

BACKGROUND OF THE INVENTION

In a magnetic recording disk drive, data is written by thin film magnetic transducers called "heads", which are supported over a surface of the disk while it is rotated at a high speed. The heads are supported by a thin cushion of air (an "air bearing") produced by the disk's high rotational speed.

FIG. 1 illustrates a prior art MR head, which may be employed as a magnetic head on a slider. The head 30B has a pole tip region, an insulation stack region and a coil region, the pole tip region extending from the ABS to the insulation stack region, the insulation stack region extending from the pole tip region to the back gap (not shown) and the coil region located in the insulation stack region but spaced from the pole tip region. In the present framework, the first and second shield layers S1 and S2 are located in the pole tip region for the protection of the MR sensor. The first shield S1 terminates between the pole tip region and the coil region along a slope 50. This provides a sunken or depressed area 51 for subsequent thin film layers of the head which makeup the insulation stack. The second gap layer G2 extends along the slope 50 of the first shield S1, thence perpendicular to the ABS toward a back region of the head. It should be noted that leads are not shown following the same path. The leads for the head 30B may take a different path.

The layer S2/P1, write gap, insulation layer I1, write coil, insulation layers I2 and I3, and the second pole piece P2 are all recessed by the depression provided by the first shield layer S1 in the insulation stack region lowering the height of the second pole piece above the write gap plane so as to enhance planarization of the second pole tip PT2. This significantly reduces the aspect ratio of the resist during fabrication of the pole tip PT2, enabling construction of the pole tip at the ABS with a thin layer of resist, in the order of 4 um as seen by the thickness of the resist layer 40 at the ABS. A thinner resist layer permits a narrower pole tip to be precisely constructed with good definition, thereby enhancing the bit density of the head. Of further significance, is elimination of a large portion of the first shield layer S1, which reduces the induction that opposes the operation of the write coil. The portion of the first shield layer S1 remaining is remote from the write coil so that when high frequency currents are conducted through the write coil, its EMF is not significantly opposed by the CEMF of the first shield S1.

The slope 50 of the first shield S1 may be constructed by a resist layer with a negative slope. Permalloy may then be plated adjacent the negative slope, after which the resist is removed to produce the slope 50 of the first shield S1.

Prior art FIG. 2A illustrates a top view of the MR head of FIG. 1. As shown, an end 201 of the top pole layer P2 extends farther toward the coil 202 with respect to the flanking portions of the bottom pole layer P1. In use, a photoresist layer that is deposited over the coil 202 for creating the notched pole tip PT1*b* adhesively couples to the end 201 of the top pole layer P2. However, it fails to reach ends 203 of the bottom pole layer P1. This results in the exposure of the coil 202 during ion beam milling that is used to create the notched pole tip PT1*b*.

Prior art FIG. 2B is a cross-sectional view taken along line 2B—2B of FIG. 2A which illustrates the manner in which the ion beams 200 erode the coil 202 during the processing of the structure of FIG. 1. As shown, a primary contributor of this problem is the fact that it is extremely difficult to mask a photoresist layer tightly against an edge of the bottom pole layer P1.

Prior art FIG. 2C illustrates actual damage 204 to the coil structure 202 resulting from the above problem. It should be further noted that since the coil structure 202 is closer and tighter to the bottom pole, any damage to the coil structure 202 has significant ramifications on data rates and overwriting operations.

There is thus a need for a magnetic head structure and a method of manufacturing the same that avoids damage to a coil structure during ion beam formation of a notched pole tip.

DISCLOSURE OF THE INVENTION

A system and method are provided for manufacturing a magnetic head. Initially, a coil structure, a first pole layer, and a gap layer are formed. A second pole layer is then deposited to form a pair of flanking portions flanking a central portion of the second pole layer. Thereafter, the second pole layer is masked with a photoresist layer. During manufacture, the flanking portions of the second pole layer work in conjunction with the photoresist layer to substantially protect the coil structure from damage.

BRIEF DESCRIPTION OF THE DRAWINGS

For a fuller understanding of the nature and advantages of the present invention, as well as the preferred mode of use, reference should be made to the following detailed description read in conjunction with the accompanying drawings. It should be noted that at least a portion of the following drawings are not drawn to scale.

Prior art

Prior art

Prior art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
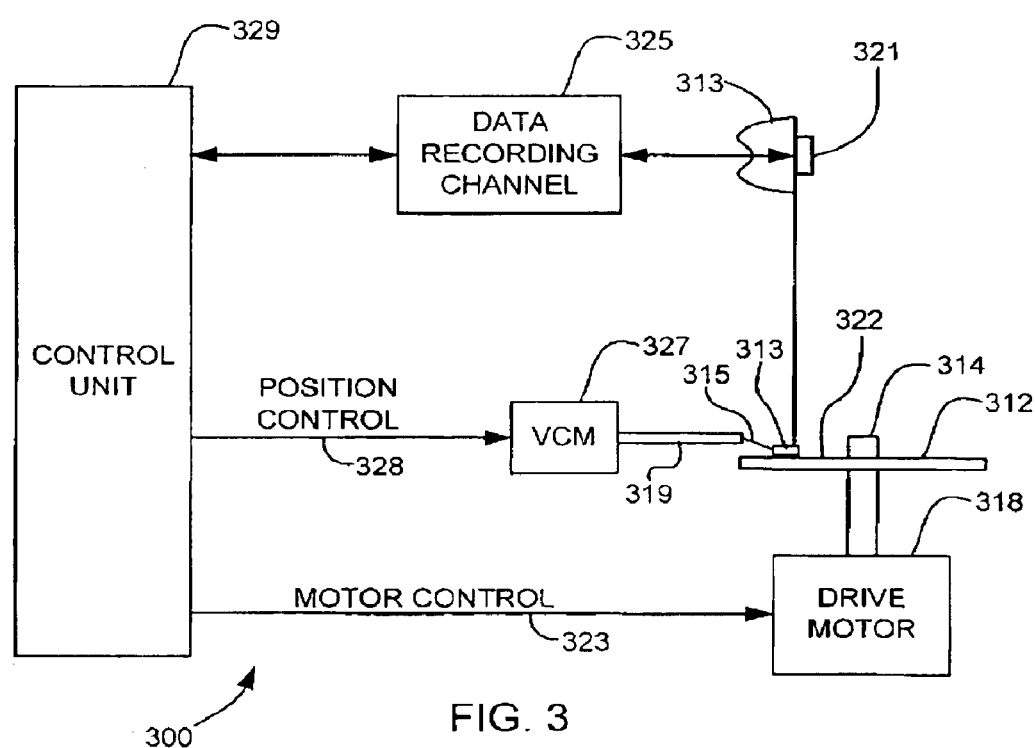
FIG. 3 shows a disk drive, in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded.

Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor.

The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4:
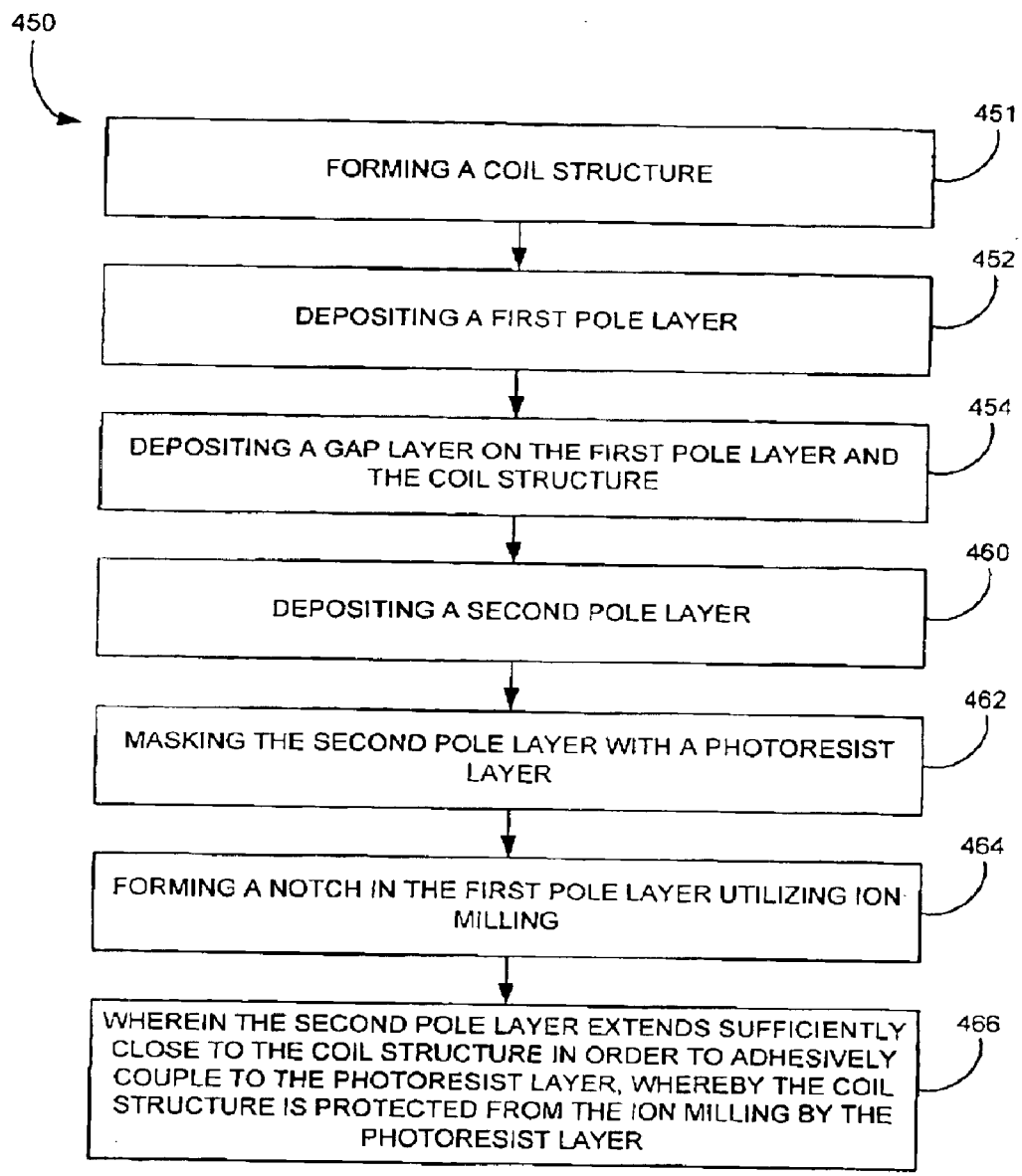
FIG. 4 illustrates a method for preventing damage to a head coil structure during ion milling a first pole notch, in accordance with one embodiment.

FIG. 4 illustrates a method 450 for preventing damage to a head coil structure during ion milling a first pole notch, in accordance with one embodiment. While such method 450 may be carried out in the context of heads 321 of FIG. 3, it should be noted that the method 450 may further be employed in any desired context.

Figure 1:
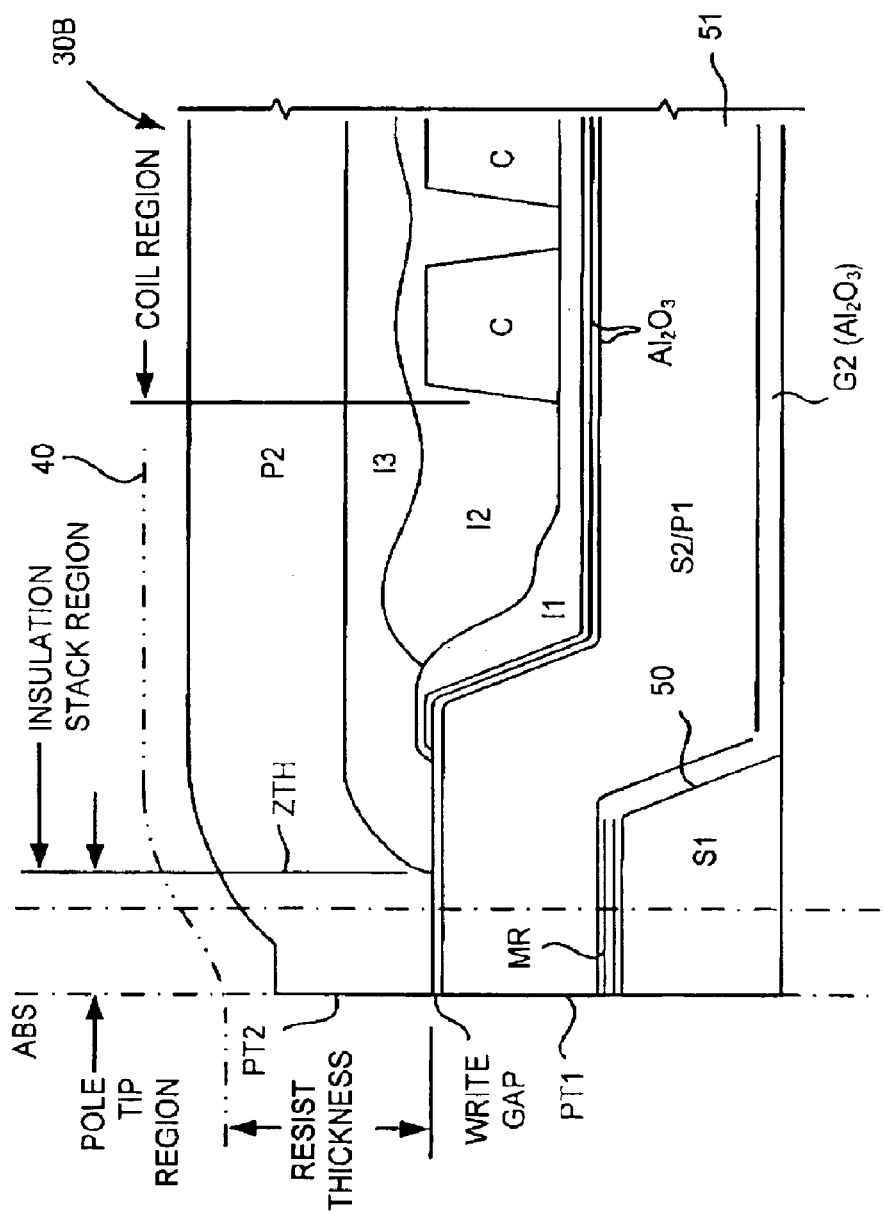
FIG. 1 illustrates a prior art "merged" magnetoresistive (MR) read/inductive write head.
Figure 2A:
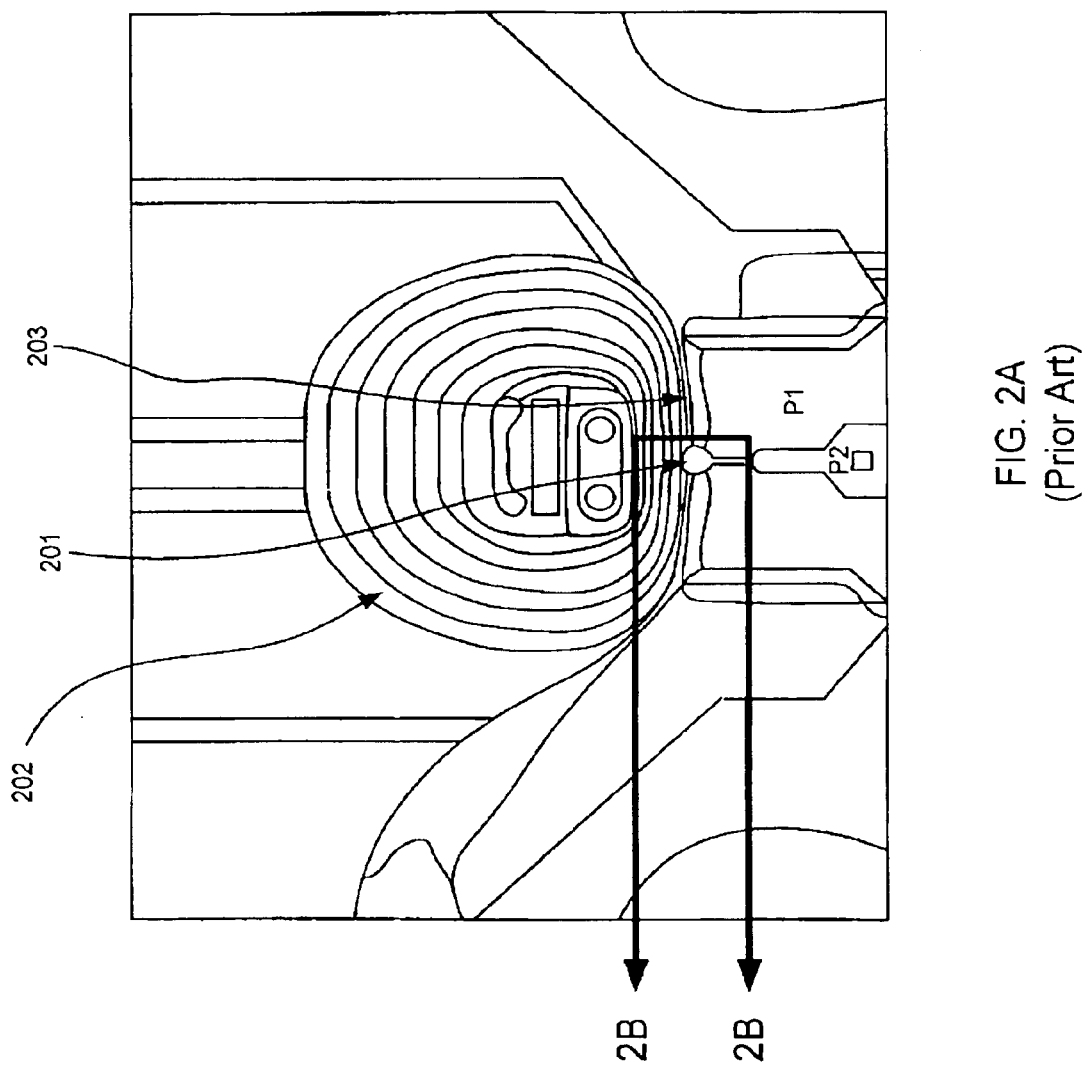
FIG. 2A illustrates a top view of the MR head of FIG. 1.
Figure 2B:
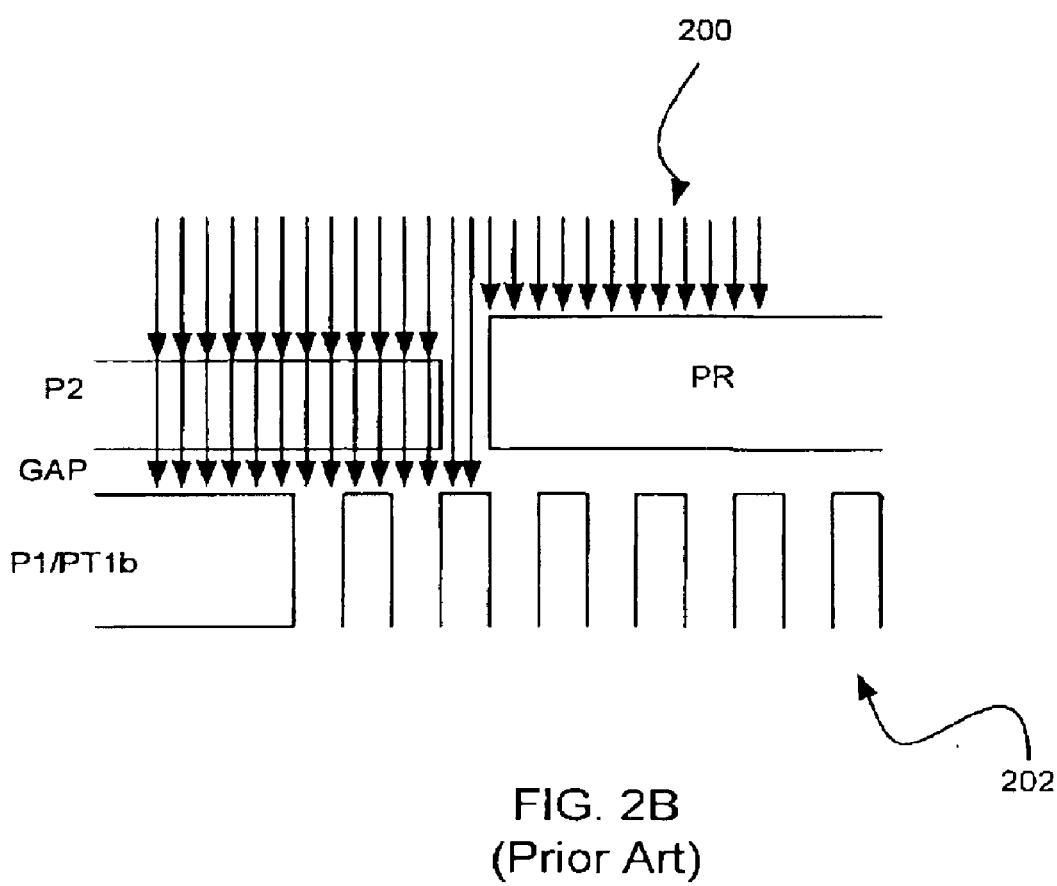
FIG. 2B is a cross-sectional view taken along line 2B—2B of FIG. 2A which illustrates the manner in which the ion beams erode the coil during the processing of the structure of FIG. 1.
Figure 2C:
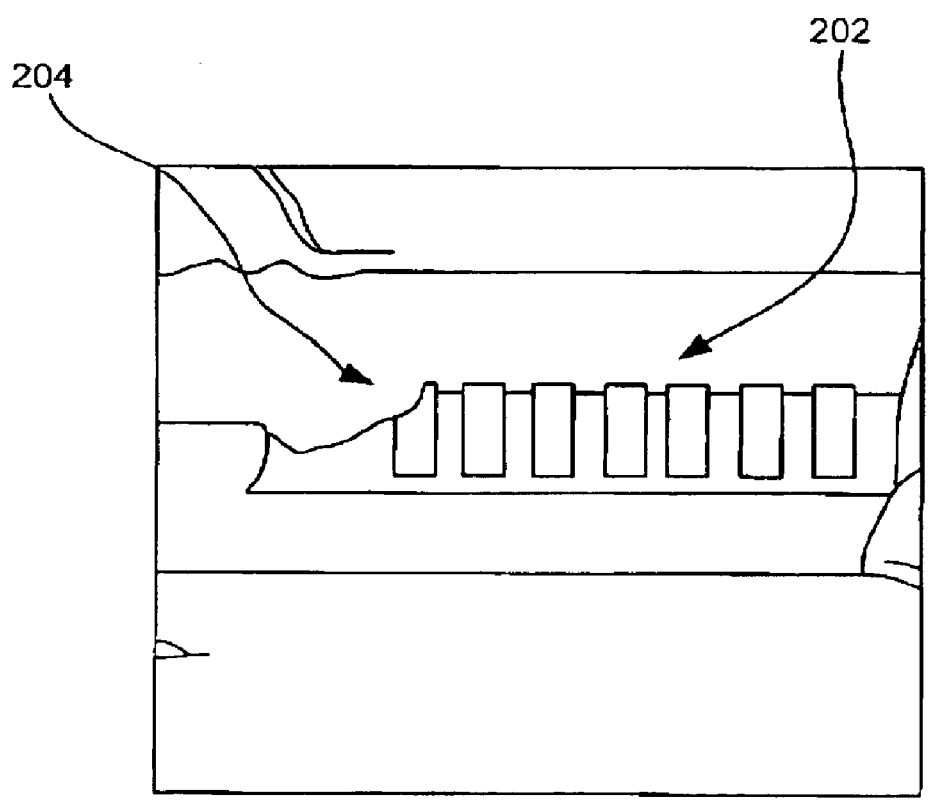
FIG. 2C illustrates actual damage to a coil structure.

Initially, a coil structure is formed on lower layers in any desired manner such as that shown in FIG. 1. See operation 451. As shown, a first pole layer and a gap layer are deposited in operations 452 and 454. The gap layer may be constructed utilizing any desired material such as alumina or the like. Further, it should be noted that the foregoing operations may be carried out in any desired manner.

Next, the second pole layer is deposited in operation 460 using masks, etc. The second pole layer is preferably deposited such that a pair of dams is formed for reasons that will soon become apparent. It should be noted that the second pole layer and the dams may be constructed utilizing a Permalloy or any desired material known to those of ordinary skill in the art.

Figure 5:
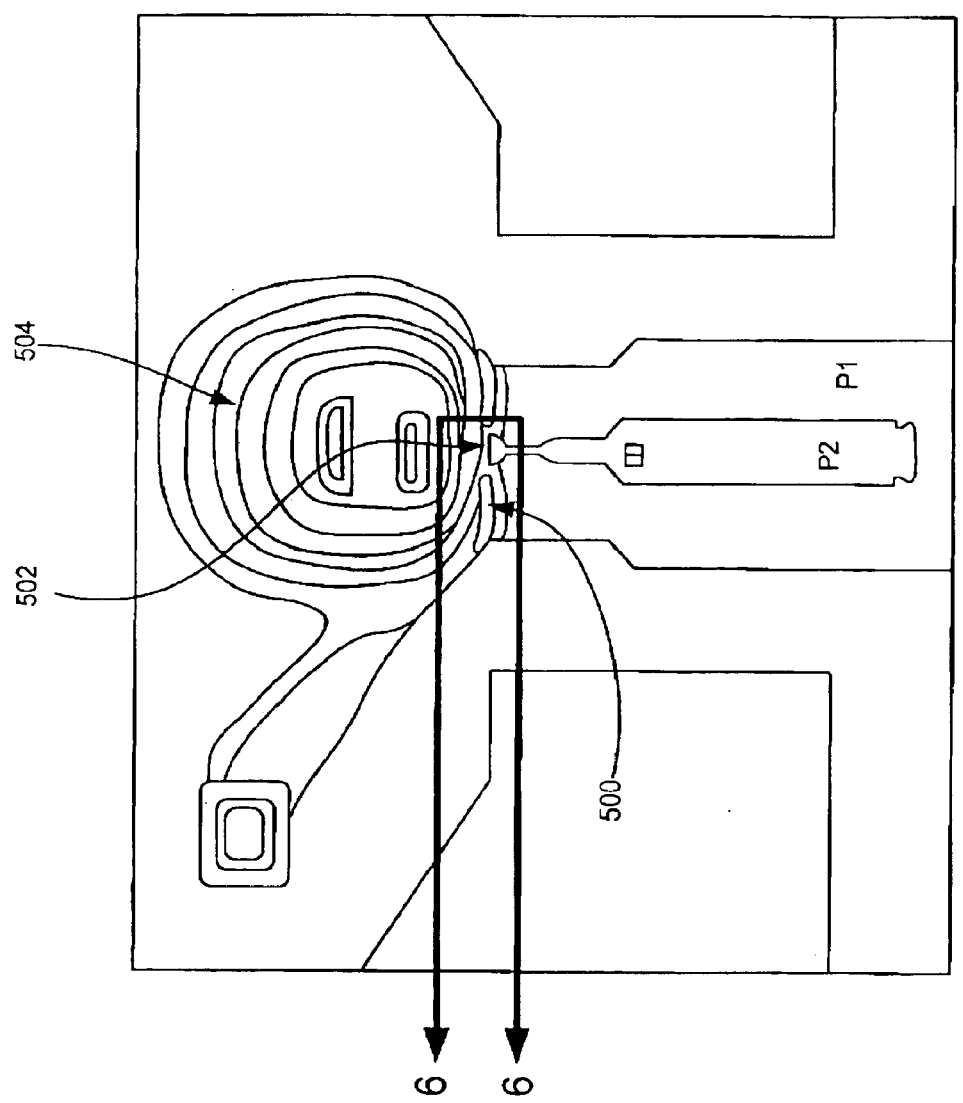
FIG. 5 illustrates the dams that are formed in addition to the second pole layer in operation 460 of FIG. 4, in accordance with one embodiment.

FIG. 5 illustrates the dams 500 that are formed in addition to the second pole layer P2 in operation 460 of FIG. 4, in accordance with one embodiment. As shown in FIG. 5, the dams 500 flank a flare point 502 of the second pole layer P2. The dams 500 are slightly spaced from the flare point 502 and extend outwardly therefrom with a slightly arcuate configuration. Ideally, such arcuate design follows and is contiguous with an arc associated with a periphery of the coil structure 504.

As an option, the dams 500 defined by the second pole layer P2 may extend at least 10 um toward the coil structure with respect to an end of a pole tip defined by the notch which resides adjacent the coil structure 504. Moreover, to ensure that the dams 500 do not cause any magnetic performance degradation, the dams 500 may be spaced a lateral distance of at least 0.5 um from the flare point 502 of the second pole layer P2.

With continuing reference to FIG. 4, the second pole layer is then masked with a photoresist layer. Note operation 462. As best shown in FIG. 5, the location to be masked in operation 462 is that including the second pole layer P2 and excluding the first pole layer P1.

Next, operation 464, notching is carried out in the area of the first pole layer P1 that is exposed by the mask. The notching may be carried out utilizing ion milling or any desired process.

The criticality of the dams is thus realized during the deposition of the photoresist mask during operation 462, and the notching of operation 464. In particular, the second pole layer that forms the "dams" resides sufficiently close to the coil structure 504 in order to adhesively couple to the photoresist layer. In the context of the present invention, it is imperative to note that photoresist exhibits an "adhesive" property, whereby the photoresist abuts and "sticks" to the dams. This is vital so that the photoresist layer is capable of protecting the coil structure 504 from the ion milling. See operation 466.

Figure 6:
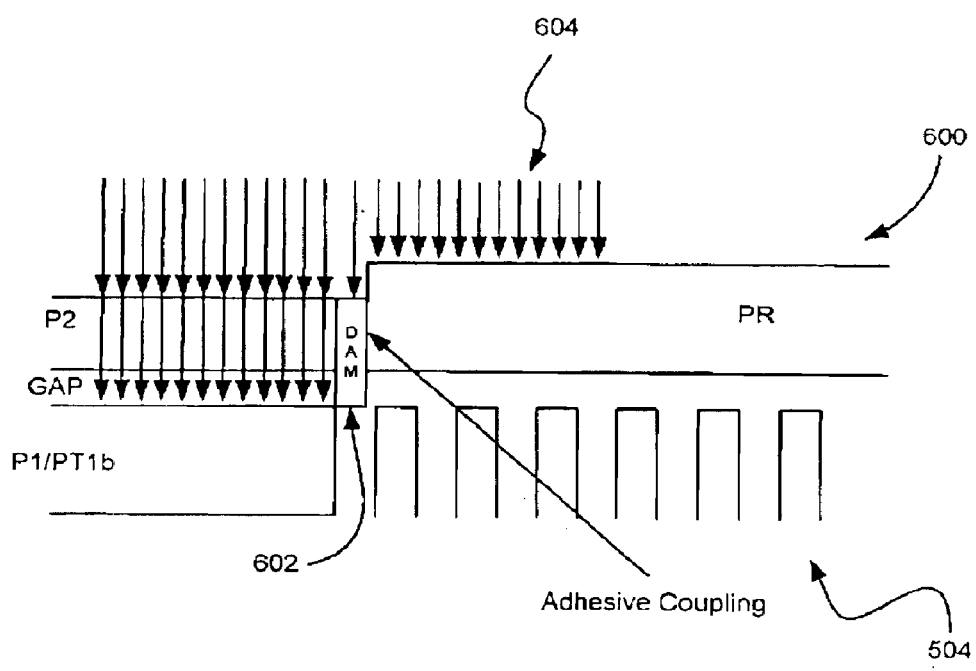
FIG. 6 is a cross-sectional view taken along line 6—6 shown in FIG. 5, which shows the manner in which the dams formed by the second pole layer abut the photoresist layer for protecting the coil structure from the ion milling during the notching of the first pole layer.

FIG. 6 is a cross-sectional view taken along line 6—6 shown in FIG. 5, which shows the manner in which the dams 602 formed by the second pole layer P2 abut the photoresist layer 600 for protecting the coil structure 504 from the ion milling 604 during the notching of the first pole layer P1.

Figure 7:
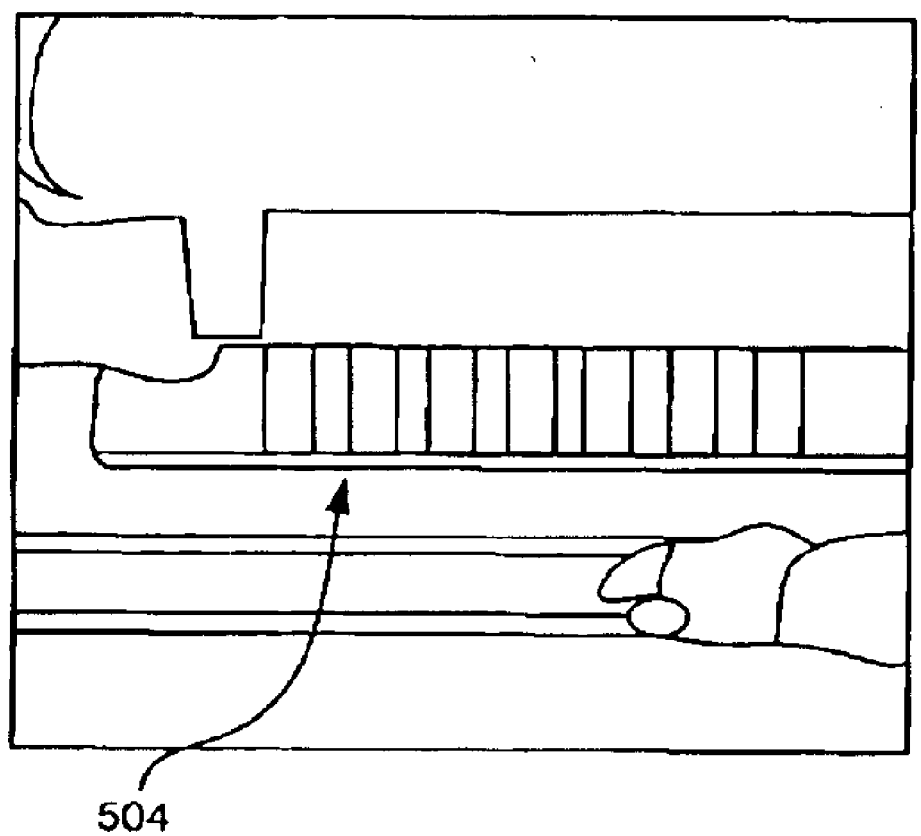
FIG. 7 illustrates the resultant coil structure which shows no damage as a result of the foregoing process.

FIG. 7 illustrates the resultant coil structure 504 which shows no damage as a result of the foregoing process.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:

a coil structure;

a first pole layer situated on the coil structure;

a gap layer situated on the first pole layer and the coil structure; and a second pole layer configured to form a pair of dams flanking a central portion of the second pole layer and adapted to substantially protect the coil structure from damage during manufacture.

2. The apparatus as recited in claim 1, wherein the coil structure includes a sunken coil structure.

3. The apparatus as recited in claim 1, wherein the dams of the second pole layer are arcuate dams.

4. The apparatus as recited in claim 1, wherein the dams of the second pole layer are spaced from the central portion of the second pole layer at least 0.5 um to prevent magnetic performance degradation.

5. The apparatus as recited in claim 1, wherein the dams of the second pole layer are adhesively coupled to a photoresist layer to ensure that the photoresist layer substantially protects the coil structure from damage during manufacture.

6. The apparatus as recited in claim 1, wherein a notch is formed in the first pole layer.

7. The apparatus as recited in claim 6, wherein the notch is formed in the first pole layer utilizing ion milling, a photoresist layer substantially protecting the coil structure from damage caused by the ion milling.

8. The apparatus as recited in claim 7, wherein the dams of the second pole layer extend at least 10 um toward the coil structure with respect to an end of a pole tip defined by the notch which resides adjacent the coil structure.

9. A disk drive system, comprising:

a magnetic recording disk;

a magnetic head including:

a coil structure, a first pole layer situated on the coil structure, a gap layer situated on the first pole layer and the coil structure, and a second pole layer configured to form a pair of dams flanking a central portion of the second pole layer and adapted to substantially protect the coil structure from damage during manufacture;

an actuator for moving the magnetic head across the magnetic recording disk so the magnetic head may access different regions of the magnetic recording disk; and a controller electrically coupled to the magnetic head.

* * * * *